(12) United States Patent
Qiu et al.

(10) Patent No.: US 10,243,478 B2
(45) Date of Patent: Mar. 26, 2019

(54) HIGH-POWER SINGLE-STAGE LED DRIVER WITH BIPOLAR RIPPLE CANCELLATION

(71) Applicant: Queen's University at Kingston, Kingston (CA)

(72) Inventors: Yajie Qiu, Kingston (CA); Yan-Fei Liu, Kingston (CA)

(73) Assignee: Queen's University at Kingston, Kingston, Ontario (CA)

( * ) Notice: Subject to any disclaimer, the term of this patent is extended or adjusted under 35 U.S.C. 154(b) by 3 days.

(21) Appl. No.: 15/509,385

(22) PCT Filed: Sep. 11, 2015

(86) PCT No.: PCT/CA2015/050880
§ 371 (c)(1),
(2) Date: Mar. 7, 2017

(87) PCT Pub. No.: WO2016/037287
PCT Pub. Date: Mar. 17, 2016

(65) Prior Publication Data
US 2017/0279367 A1    Sep. 28, 2017

Related U.S. Application Data

(60) Provisional application No. 62/049,418, filed on Sep. 12, 2014.

(51) Int. Cl.
*H02M 1/15* (2006.01)
*H02M 7/04* (2006.01)
(Continued)

(52) U.S. Cl.
CPC .............. *H02M 7/04* (2013.01); *G05B 11/42* (2013.01); *H02M 1/12* (2013.01); *H02M 1/143* (2013.01);
(Continued)

(58) Field of Classification Search
CPC ........ H05B 33/0815; H02J 1/02; H02M 1/14; H02M 1/15; H02M 3/335; H02M 2001/0077
See application file for complete search history.

(56) References Cited

U.S. PATENT DOCUMENTS 6,084,786 A     7/2000 Rozman
6,650,554 B2 *  11/2003 Darshan ................. H02H 9/001
                                                    323/207
(Continued)

FOREIGN PATENT DOCUMENTS

WO    WO2013/056356 A1    4/2013

OTHER PUBLICATIONS

Fang, P. at al., "Zero Ripple Single Stage AC-DC LED Driver with Unity Power Factor", IEEE, 3452-3458 (2013).
(Continued)

*Primary Examiner* — Gary L Laxton
(74) *Attorney, Agent, or Firm* — Stephen J. Scribner

(57) ABSTRACT

Provided are circuits and methods for a power converter that converts AC input power into DC output power using a first output circuit that provides a first output comprising a DC voltage with a first AC voltage ripple and a second output circuit including a floating capacitor and one or more power switching device, and provides a second output comprising a second AC voltage ripple, wherein the first output and the second output are connected together in series, such that the first AC voltage ripple is substantially cancelled and substantially ripple-free DC output power is provided. Embodiments significantly reduce the total output capacitance requirement without sacrificing power factor, thus avoiding the need for electrolytic capacitors and enabling the use of long-life film capacitors. The circuits and methods are particularly suitable for use in applications where ripple-free high power and high reliability are required, such as in high power LED lighting.

17 Claims, 19 Drawing Sheets

(51) Int. Cl.
| | | |
|---|---|---|
| G05B 11/42 | (2006.01) | |
| H02M 1/14 | (2006.01) | |
| H02M 1/42 | (2007.01) | |
| H02M 1/12 | (2006.01) | |
| H05B 33/08 | (2006.01) | |

(52) U.S. Cl.
CPC ...... *H02M 1/4258* (2013.01); *H05B 33/0815* (2013.01); *Y02B 70/126* (2013.01)

(56) References Cited

U.S. PATENT DOCUMENTS

| | | |
|---|---|---|
| 8,553,430 B2 | 10/2013 | Melanson et al. |
| 2011/0148318 A1 | 6/2011 | Shackle et al. |
| 2014/0252973 A1* | 9/2014 | Liu .................... H02J 1/02 315/200 R |

OTHER PUBLICATIONS

Fang, P. et al., "An Electrolytic Capacitor-Free Single Stage Buck-Boost LED Driver and its Integrated Solution", IEEE, 1394-1401, (2014).

Fang, P., et al., "Single Stage Primary Side Controlled Offline Flyback LED Driver with Ripple Cancellation", IEEE, 3323-3328, (2014).

Qiu, Y., et al., "Electrolytic-Capacitor-Less High-Power LED Driver", IEEE, 3612-3619, (2014).

International Search Report and Written Opinion dated Dec. 9, 2015 for corresponding International Application No. PCT/CA2015/050880 filed on Sep. 11, 2015.

* cited by examiner

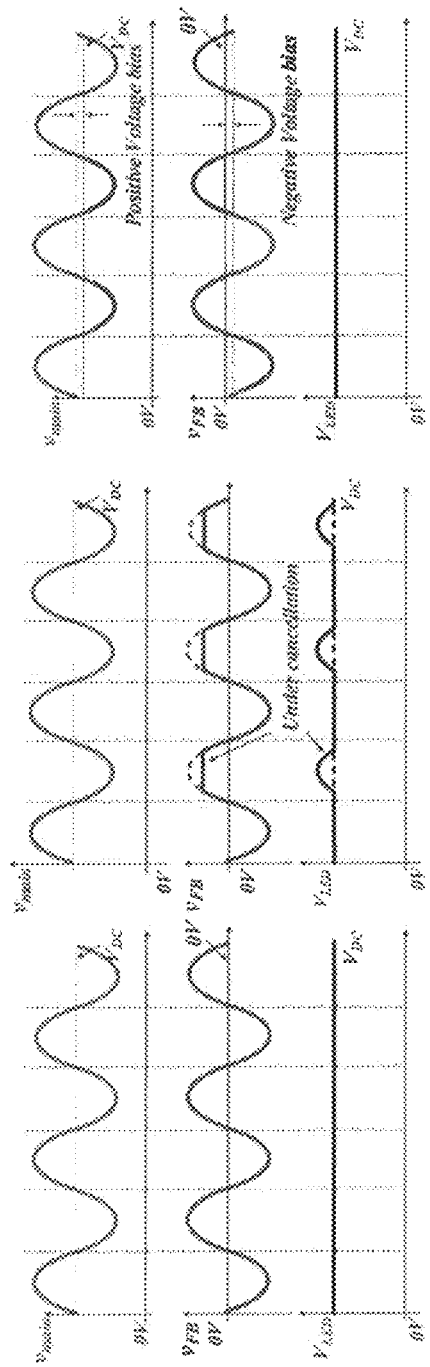

HIGH-POWER SINGLE-STAGE LED DRIVER WITH BIPOLAR RIPPLE CANCELLATION

RELATED APPLICATION

This application claims the benefit of the filing date of U.S. Application No. 62/049,418, filed on 12 Sep. 2014, the contents of which are incorporated herein by reference in their entirety.

FIELD

The invention relates to a bipolar ripple cancelling single-stage AC-DC converter and control method therefor. The converter achieves a high power factor at the AC input side and produces a substantially ripple-free high power DC output, while avoiding the need for electrolytic output capacitors. The converter is a cost effective solution for applications requiring high power, ripple-free DC output, and high reliability, such as in high power LED lighting applications.

BACKGROUND

As LED lighting technology improves, cost-effective and energy-efficient LED lighting will become dominant in high power lighting applications due to its high luminous flux, high efficacy, and long life span. AC-connected high-power LED lighting is commonly used in outdoor lighting applications such as street lights, parking lot lights and high bay industrial lights. In high power applications, the power supplies (i.e., LED drivers) typically operate at $V_{in}$=85 to 265 $V_{ac}$ and $P_O$>50 W. In these applications, many LEDs are connected in series to increase the light output. This configuration results in a combination of a high output voltage and low output current requirement for the drivers, and usually requires isolation.

Conventional approaches for high-power LED drivers include two categories: (a) two-stage configurations and (b) single-stage configurations, as shown in FIGS. 1A and 1B. The two-stage configuration shown in FIG. 1A can achieve high power factor and tight output current regulation, making it a mainstream solution for high-power LED drivers. However, it exhibits poor efficiency and low power density. Large capacitors (generally around 1 μF per Watt) are typically required at the output of the power factor correction (PFC) stage to buffer the power difference of the AC input and DC output. The PFC output capacitance can be reduced by increasing the voltage ripple. However, capacitance reduction is limited because the PFC output voltage must be higher than the minimum input line voltage to ensure normal operation of the PFC converter. Therefore, electrolytic capacitors are still required for two-stage high power applications.

Although the conventional single-stage configuration, shown in FIG. 1B, presents a cost-effective and high-efficiency solution, large electrolytic capacitors are still necessary to reduce the double line frequency (e.g., 100 Hz or 120 Hz) current ripple. Otherwise, the double line frequency current ripple will cause light flickering, which is harmful to human visual system.

Electrolytic capacitors suffer from relatively short operating life (e.g., 5,000 hours), compared to the lifetime of an LED lamp (e.g., >50,000 hours). Also, electrolytic capacitor life span is a function of operating temperature, as the life span halves for each 10° C. increase in operating temperature. Therefore, the life span problem becomes more significant in outdoor applications such as street lighting. Clearly, the use of electrolytic capacitors in these conventional approaches presents a significant drawback.

Solutions have been proposed to reduce the ripple and remove the electrolytic capacitors. For example, one method is to inject the harmonics (3rd and 5th) into the input current. However, this sacrifices the power factor, which is unacceptable for high-power LED drivers. In another approach, an auxiliary ripple cancellation stage is connected in parallel with the PFC output to reduce the PFC output capacitance, as shown in FIG. 1C. In this approach the auxiliary stage must withstand a high voltage stress equal to the PFC output voltage. The voltage ($V_{aux}$) across the auxiliary capacitor ($C_{aux}$) is even higher. Therefore, high voltage-rating components are necessary, which generally have higher cost and lower efficiency than their low-voltage counterparts. In addition, an output filter inductor $L_O$ is required to be connected in series with the LED load to limit the LED current ripple.

SUMMARY

Described herein are power converter embodiments that convert AC input power into DC output power, comprising: an input circuit that receives AC input power, the input circuit having one or more power switching device; a first output circuit that receives power from the input circuit and provides a first output comprising a DC voltage with a first AC voltage ripple; a second output circuit that receives power from a circuit comprising a floating capacitor and provides a second output comprising a second AC voltage ripple, the second output circuit having one or more power switching device; wherein the first output and the second output are connected together in series, such that the first AC voltage ripple is substantially cancelled; wherein substantially ripple-free DC output power is provided. The AC voltage ripple may have a frequency that is double a line frequency of the AC input power.

Embodiments may comprise a controller that controls the power switching devices of the input circuit and the second output circuit, and controls a voltage of the floating capacitor so that the first output circuit and the second output circuit alternatively rectify output current only once during one switching cycle of the power switching devices. In one embodiment the controller includes a slow PI control loop that controls the voltage of the floating capacitor.

In one embodiment the controller includes a power loss offset loop that allows the second output circuit to absorb more input energy than output energy in each double line frequency cycle; wherein energy loss resulting from the second output circuit is offset.

In one embodiment the controller regulates the voltage of the floating capacitor at a reference value. In one embodiment the controller controls the one or more power switching device of the input circuit so that the input circuit achieves a high power factor.

The power converter may comprise a PFC converter selected from a flyback converter, a buck converter, a boost converter, an isolated boost converter, a LLC resonant converter, and a LCLC resonant converter.

In one embodiment the power converter further comprises a secondary power supply that provides input power to the second output circuit.

Also described herein are methods for converting AC input power into DC output power, comprising: receiving AC input power using an input circuit having one or more power switching device; using a first output circuit to receive power from the input circuit and provide a first output comprising a DC voltage with a first AC voltage ripple; using a second output circuit including a floating capacitor and one or more power switching device to provide a second output comprising a second AC voltage ripple; connecting the first output and the second output together in series, such that the first AC voltage ripple is substantially cancelled; wherein the AC input power is converted into substantially ripple-free DC output power.

The method may comprise controlling the power switching devices of the input circuit and the second output circuit, and controlling a voltage of the floating capacitor so that the first output circuit and the second output circuit alternatively rectify output current only once during one switching cycle of the power switching devices.

In one embodiment, controlling includes using a slow PI control loop to control the voltage of the floating capacitor. In one embodiment controlling includes allowing the second output circuit to absorb more input energy than output energy in each double line frequency cycle; wherein energy loss resulting from the second output circuit is offset. In one embodiment controlling includes using a power loss offset loop to allow the second output circuit to absorb more input energy than output energy in each double line frequency cycle. In one embodiment controlling regulates the voltage of the floating capacitor at a reference value.

The method may comprise using a PFC converter selected from a flyback converter, a buck converter, a boost converter, an isolated boost converter, a LLC resonant converter, and a LCLC resonant converter.

In one embodiment the method may further comprise providing input power to the second output circuit using a secondary power supply.

In one embodiment the method may include controlling the one or more power switching device of the input circuit so that the input circuit achieves a high power factor.

BRIEF DESCRIPTION OF THE DRAWINGS

For a better understanding of the invention, and to show more clearly how it may be carried into effect, embodiments will be described, by way of example, with reference to the accompanying drawings, wherein:

FIGS. 5A-5C are plots showing an under-cancellation phenomenon analysis, wherein FIG. 5A shows an ideal case; FIG. 5B shows a case without a loss offset loop in the control strategy; and FIG. 5C shows a case with a loss offset loop in the control strategy (e.g., as shown in FIG. 4A).

DETAILED DESCRIPTION OF EMBODIMENTS

Figure 1A:
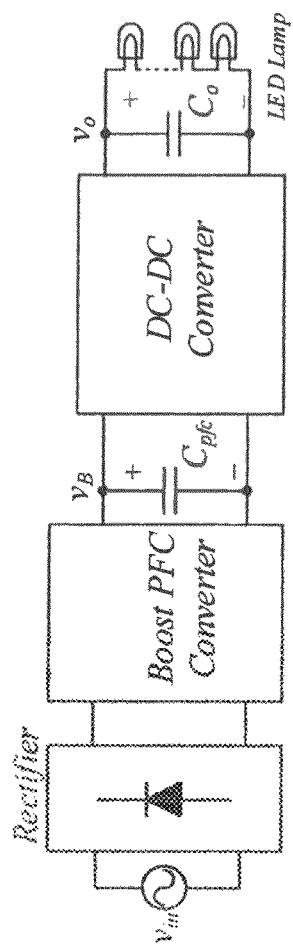
FIGS. 1A and 1B are block diagrams of conventional two stage and single stage high-power LED driver configurations, respectively.
Figure 1B:
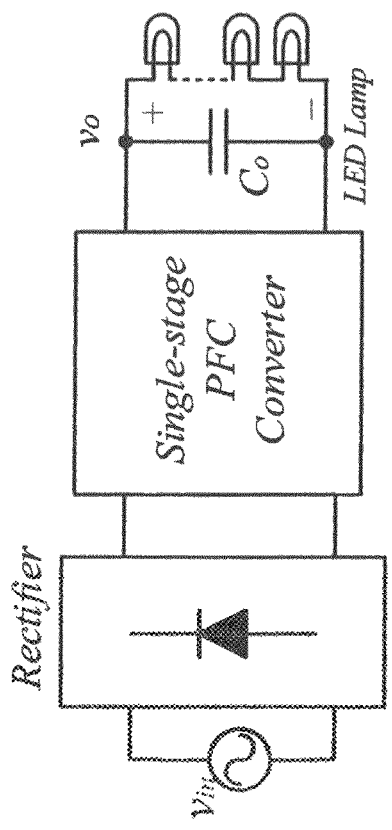
Figure 1C:
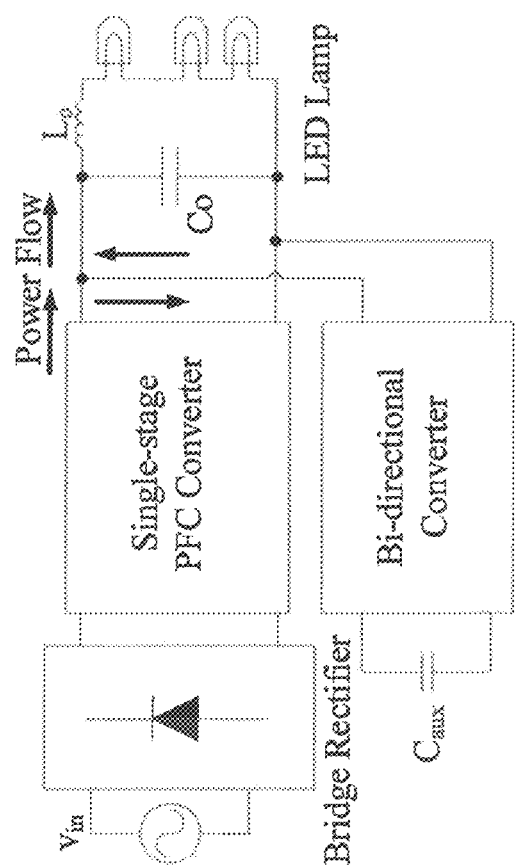
FIG. 1C is a block diagram of a parallel ripple cancellation configuration according to the prior art.

Described herein are ripple cancellation circuits and methods that produce a DC output that is substantially low frequency ripple-free, and minimize the output capacitance requirement, enabling the use of long-life film capacitors. The term "low frequency ripple" is intended to refer to the second harmonic of the AC input power (e.g., 120 Hz in North America or 100 Hz in China, Europe). Compared to existing technologies, the embodiments described herein minimize or substantially eliminate the low frequency current ripple through the LED lamps and achieve a high power factor and high efficiency. Embodiments are particularly well-suited to high power applications, such as high power LED lighting, because of their high power factor, high efficiency, and reduction or elimination of visible flickering of the light emitting from the LED lamps. Accordingly, embodiments are described herein with respect to such applications. However, it will be appreciated that the embodiments may be applied to other applications; e.g., applications where the load is not an LED lamp. Thus, throughout the description and drawings, the load may include one or more LEDs, or the load may not include any LEDs. In lighting applications, embodiments may be implemented in a LED lamp, or in a separate power supply used to drive one or more LED lamps.

Embodiments relate to a high power single-stage LED driver configuration with a bipolar (i.e., AC) ripple cancellation stage. The bipolar ripple cancellation circuits include a full bridge converter used to generate an AC voltage with zero DC bias which substantially cancels the low frequency voltage ripple of the PFC output. The full bridge ripple cancellation converter (FBRCC) stage allows the PFC output capacitance to be significantly reduced, so that long-life film capacitors may be used. The power converter PFC stage may be implemented with a flyback converter, or any other single-stage PFC stage, such as, but not limited to, buck converter, boost converter, isolated boost converter, LLC resonant converter, and LCLC resonant converter. The series bipolar ripple cancellation embodiments significantly reduce the total output capacitance of an LED driver without sacrificing the power factor, thus avoiding the need for electrolytic capacitors and enabling the use of long-life film capacitors.

The term "substantially" refers to the fact that the converter produces DC power with only very small low frequency ripple or no low frequency ripple, such that the DC power is suitable for use in sensitive applications such as LED lighting. However, as noted above, embodiments may be used in applications other than driving LEDs.

In the embodiments described herein, a floating capacitor is used as the input of the full bridge converter because the net power provided by the full bridge converter is zero under ideal conditions, and is very small if the power loss in the FBRCC is considered. The voltage of the floating capacitor may be regulated by a voltage control loop.

Operating Principle

Figure 2A:
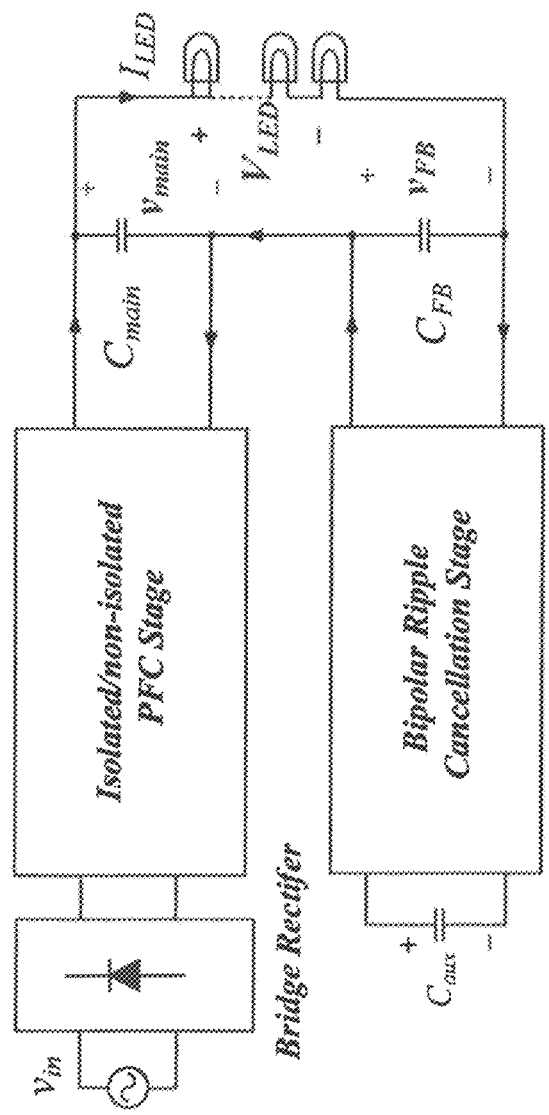
FIG. 2A is a block diagram of an LED driver with a floating capacitor bipolar ripple cancellation stage, according to one embodiment.

FIG. 2A shows a block diagram of a LED driver configuration with a floating capacitor Full bridge ripple cancellation converter. It is noted that this bipolar ripple cancellation configuration is suitable for both isolated and non-isolated single-stage PFC topologies.

Figure 2B:
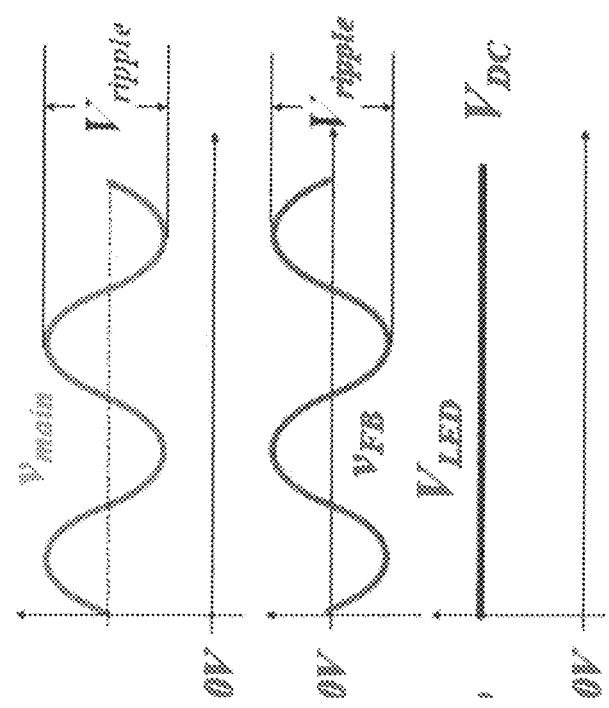
FIG. 2B is a diagram showing voltage waveforms of the generalized embodiment of FIG. 2A.

The main output voltage and the FBRCC output voltage are connected in series and the combined voltage is used to power the LED lamps. FIG. 2B shows the voltage waveforms of the main output ($v_{main}$), ripple cancellation stage output ($v_{FB}$) and the LED voltage ($V_{LED}$).

The PFC output voltage $V_{main}$ includes both the AC and DC voltage components. The AC voltage ripple is at twice the line frequency, shown as the upper curve in FIG. 2B. The expression of the PFC output voltage is given in Equation (1)

$$v_{main} = V_{DC} + v_{ripple} \quad (1)$$

where $V_{DC}$ is the DC component of the PFC output voltage, and $v_{ripple}$ is the AC component of PFC output voltage. The output voltage of the cancellation stage $v_{FB}$ is a substantially pure AC voltage, shown as the middle curve in FIG. 2B with zero DC voltage. In order to achieve a ripple-free output voltage across the LED lamps, the cancellation voltage $v_{FB}$, must offset the voltage ripple, $v_{ripple}$, as given in Equation (2).

$$v_{FB}(t) = -v_{ripple}(t) \quad (2)$$

The voltage across the LED lamp is the sum of the PFC output voltage and the cancellation stage output voltage, expressed in Equation (3).

$$V_{LED} = v_{main} + v_{FB} \quad (3)$$

Substitution of Equations (1) and (2) into (3) yields (4).

$$V_{LED} = V_{DC} \quad (4)$$

The LED lamp sees only the DC component as shown in the lower line in FIG. 2B. It is noted that the peak-to-peak value of the double line frequency voltage ripple in the PFC output $V_{ripple}$ is proportional to the LED output current $I_{LED}$ as well as the PFC output capacitance $C_{main}$, as shown in Equation (5).

$$V_{ripple} = \frac{P_{in}}{\omega \times C_{main} \times V_{LED}} = \frac{I_{LED}}{2\pi \times f \times C_{main}} \quad (5)$$

A smaller value of $C_{main}$ may be used in order to remove the electrolytic capacitor from the configuration, as discussed below.

Figure 3A:
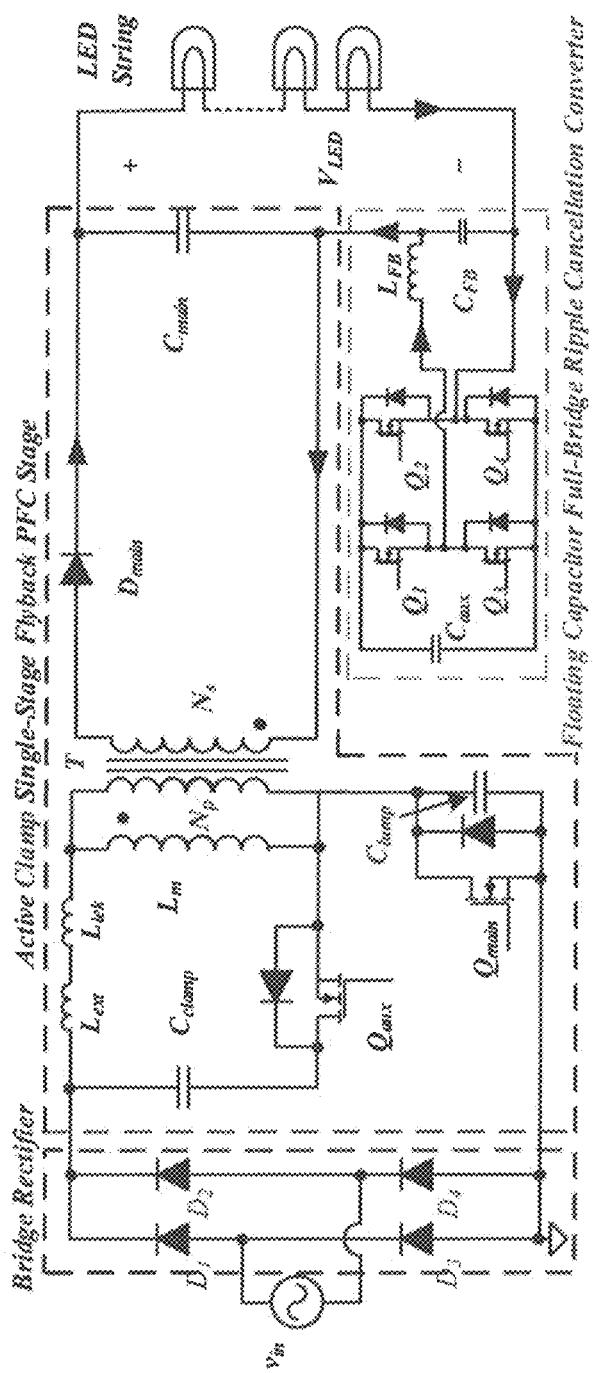
FIG. 3A is a circuit diagram of an LED driver with floating capacitor, according to one embodiment.

For applications where high-power LED lamps require electrical isolation, an isolated flyback topology may be used as the PFC stage. However, other topologies may be used for the power structure. An example of an architecture is shown in the embodiment of FIG. 3A. In this embodiment, a single-stage flyback circuit is used as the isolated PFC stage and the auxiliary bipolar ripple cancellation stage is a full-bridge ripple cancellation converter (FBRCC). The FBRCC includes four switches ($Q_1$–$Q_4$), one inductor ($L_{FB}$) and two capacitors (floating input capacitor $C_{aux}$ and output capacitor $C_{FB}$). The flyback PFC provides all of the LED driving power, and the FBRCC only cancels the AC voltage ripple. It is noted that voltage across $C_{aux}$ ($v_{Caux}$) contains the low frequency (120 Hz) ripple while $C_{FB}$ only filters out the high switching frequency noise as a part of the output filter. Therefore, $C_{FB}$ may have a small value (e.g., <5 µF). Design details for $C_{aux}$ are given below.

Figure 3B:
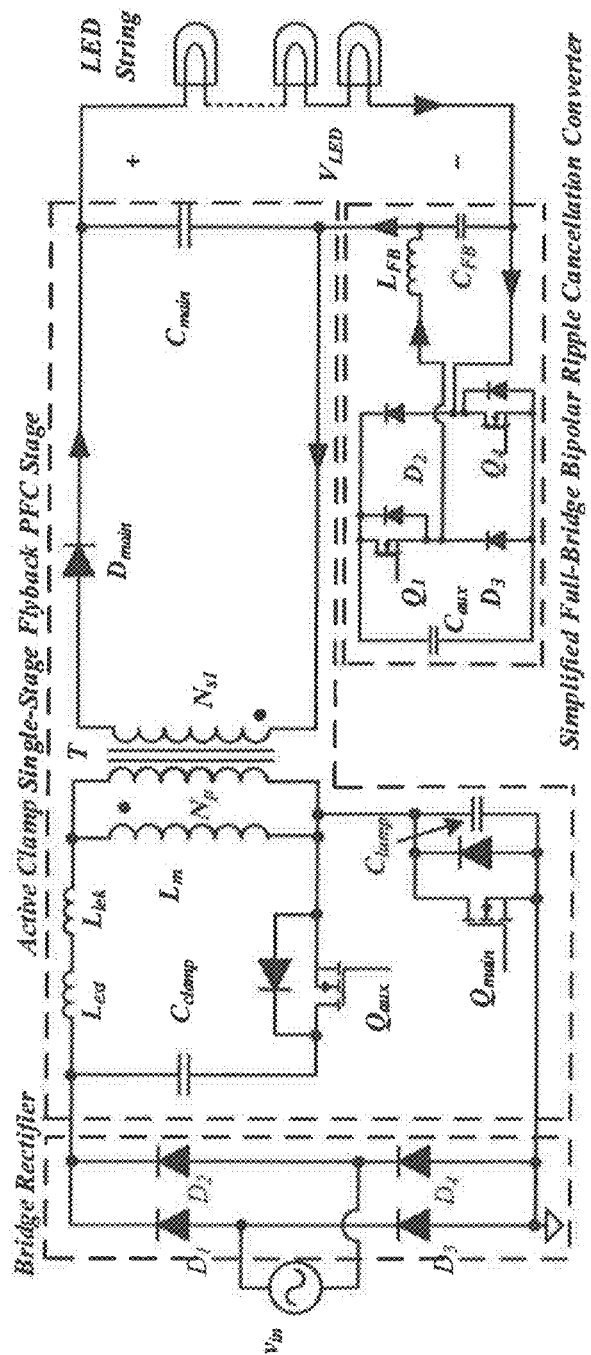
FIG. 3B is a circuit diagram of an LED driver with floating capacitor, according to another embodiment.

It is noted that when driving a DC (voltage/current) load (e.g., an LED load), the current is always passing through the body diodes of switches $Q_2$ and $Q_3$. Therefore, the circuit may be simplified by replacing $Q_2$ and $Q_3$ with two diodes $D_2$ and $D_3$, as shown in FIG. 3B. This reduces the bipolar ripple cancellation circuit cost by saving two switches and their driving circuits.

Figure 4A:
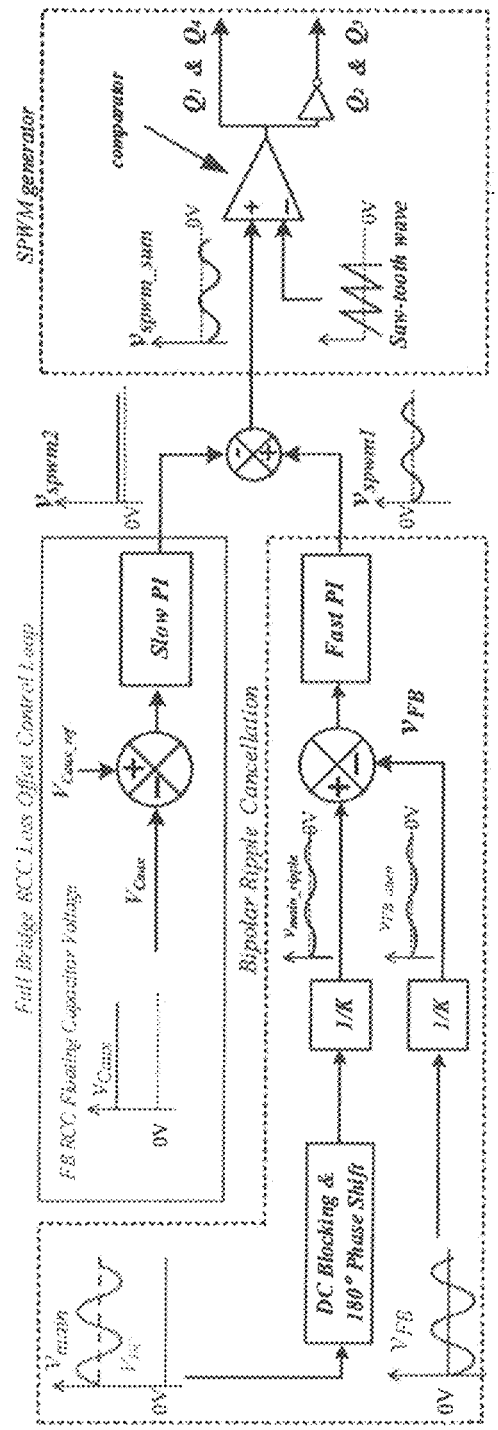
FIG. 4A is a block diagram of a control strategy for the embodiment of FIG. 3A.
Figure 4B:
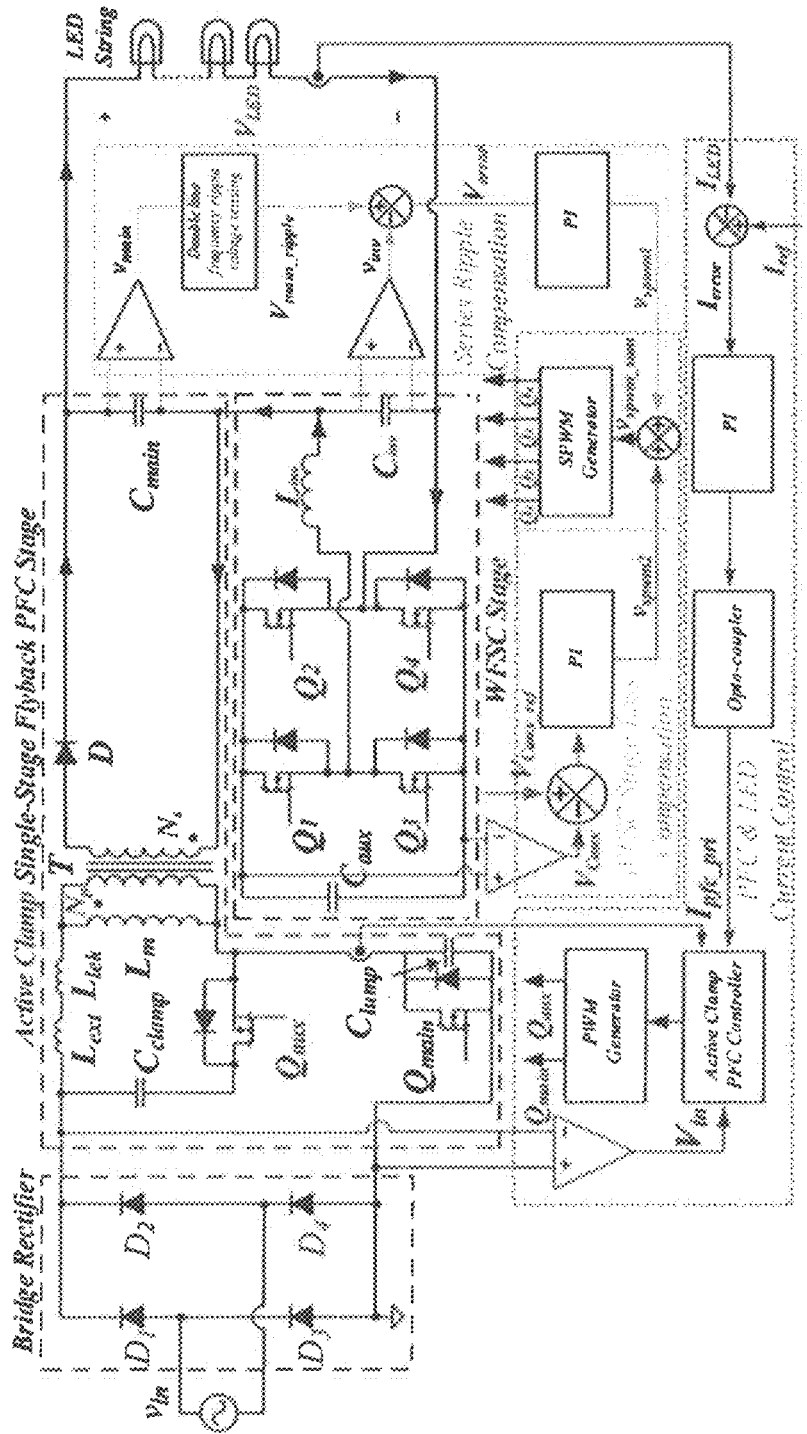
FIG. 4B is a block diagram of a control strategy according to another embodiment.

Examples of control strategies are shown in the block diagrams of FIGS. 4A and 4B. Referring to FIG. 4A, AC ripple cancellation control blocks, shown in dashed boxes, have a high bandwidth to provide a quick AC reference tracking ability. A significant difference between this control strategy and prior strategies is the method used to offset power loss in the FBRCC. In order to ensure a good ripple cancellation ability of the floating capacitor FBRCC, a power loss offset loop (shown in the box with solid lines in FIG. 4A) is provided, where the FBRCC floating capacitor voltage ($v_{Caux}$) is regulated through a slow PI control loop. A slow PI control loop may have a bandwidth of, e.g., 1 kHz, or less. This control loops avoids an "under-cancellation" phenomenon described as follows.

When the voltage of the main output is higher than the LED DC output voltage, the FBRCC provides a negative voltage to cancel the ripple and the energy flows into the FBRCC. When the voltage of the main output is lower than the LED DC output voltage, the FBRCC provides a positive voltage to cancel the ripple and the energy flows out of the FBRCC. If the FBRCC is lossless, the sum of the input energy and the output energy in a half cycle of the line frequency will be equal, and thus the $C_{aux}$ voltage will be self-balancing and $v_{FB}$ presents a symmetrical AC curve, as shown in FIG. 5A. In this case, the FBRCC provides a pure AC voltage with zero DC bias.

However, the FBRCC has power loss in a practical implementation. If the $C_{aux}$ voltage is not regulated and there is no loss offset mechanism, the input energy to the FBRCC stage will be less than the output energy in a half-line cycle, then $C_{aux}$ will be discharged and the $C_{aux}$ voltage will drop. When the $C_{aux}$ voltage is sufficiently low, the FBRCC can no longer produce the peak voltage required to cancel the main stage's ripple at valley points, and under-cancellation may occur. This phenomenon is shown in FIG. 5B, where periodic bumps occur on the DC LED voltage at twice the line frequency.

To solve this problem, the average $C_{aux}$ voltage may be regulated as shown in the embodiment of FIG. 4A, using the power loss offset control loop. This loop allows the FBRCC to absorb slightly more input energy than the output energy in each double line frequency cycle, in order to offset the energy loss. As a result, the $C_{aux}$ voltage may be kept stable and its average value can be regulated at the reference value ($V_{Caux\_ref}$).

To achieve ripple cancellation using the FBRCC topology, the inequality of Equation (6) must be satisfied:

$$V_{C_{aux}} \geq V_{FB\_pk} = 1/2 V_{ripple} \quad (6)$$

where $v_{Caux}$ is the $C_{aux}$ voltage which contains a 120 Hz ripple voltage component on the average DC voltage. $V_{FB\_pk}$ is the peak value of the FBRCC output voltage ($v_{FB}$), which is determined by the PFC output voltage ripple, $V_{ripple}$.

To accommodate both feedback loops in the floating capacitor FBRCC controller (FIG. 4A), the controller handles the following two tasks separately: (i) tracking the shape and magnitude of the periodic AC ripple, and (ii) compensating the auxiliary stage loss. According to this control strategy, it is assumed that the FBRCC loss changes slowly (i.e., the FB RCC loss value is substantially flat) so that it can be considered as a DC value in one half-line cycle, which is practical for a fixed-load LED driver.

As shown in FIG. 4A, the fast PI loop tracks the AC ripple reference ($v_{ripple\_main}$) and provides an ideal sinusoidal pulse width modulation (SPWM) control output ($v_{spwm1}$), while the slow PI loop regulates the floating capacitor voltage ($V_{Caux}$) which generates a DC control voltage ($v_{spwm2}$). These two controlling outputs are added together as $v_{spwm\_sum}$ and then compared to a saw-tooth wave to generate SPWM driver signals for the four switches ($Q_1 \sim Q_4$) in the FBRCC. As a result, the FBRCC outputs an inverted AC voltage ripple with a very small negative DC voltage bias, as shown in FIG. 5C.

It should be noted that this negative DC voltage bias in the FBRCC output ($v_{FB}$) will not affect the AC ripple reference ($v_{ripple\_main}$) and the normal operation of the fast loop in the bipolar ripple cancellation because it is a DC signal (according to the assumption). All the DC information existing in the PFC output is blocked by the analog differential circuit before it becomes the reference for the fast loop. Therefore, the reference signals of the two loops are decoupled and both loops are able to operate stably and simultaneously.

FBRCC Input Capacitor $C_{aux}$ Design

To avoid the under-cancellation phenomenon shown in FIG. 5B, the $C_{aux}$ value is critical. Its voltage changes periodically at double the line frequency, corresponding to energy exchanging in the FBRCC. The design should ensure that the voltage across $C_{aux}$ is always higher than the auxiliary output voltage, $v_{FB}$, at any time instant.

Under the assumption that the FBRCC is operating at a switching frequency much higher than the double line frequency, i.e., $f_{sw} \gg 2 \ast f_{line}$), the $C_{aux}$ capacitance value is designed according to the LED current ($I_{LED}$), the AC line voltage frequency ($f_{line}$), the allowed input voltage ripple ($V_{Caux\_ripple}$), the average input voltage ($V_{Caux\_avg}$), as well as the peak-to-peak output voltage of the FBRCC ($V_{ripple}$), as shown by Equation (7).

$$C_{aux} \geq \frac{I_{LED} \cdot V_{ripple}}{4\pi \cdot f_{line} \cdot V_{Caux\_avg} \cdot V_{Caux\_ripple}} \quad (7)$$

The capacitor $C_{aux}$ selected based on Equation (7) ensures that the FBRCC output substantially or completely cancels the ripple component in the LED lamp current, $I_{LED}$. A detailed derivation is shown in Example 2.

Design Procedure

In light of the analysis discussed above, an example of a design procedure for an LED driver with a floating capacitor bipolar ripple cancellation stage (FBRCC) may be carried out as follows:

A. Selection of Voltage Rating of the FBRCC Input Capacitor $C_{aux}$

A multi-layer ceramic capacitor is a good choice for the FBRCC input capacitor due to its small size and low cost as compared to a film capacitor. However, high-capacitance ceramic capacitors (e.g., >10 μF) become expensive or unavailable when the required DC voltage rating is over e.g., 50 V. Therefore, the design limitation of 50 V $C_{aux}$ voltage rating may be used in a practical design. The FBRCC switch ratings and the allowable PFC voltage ripple can be selected accordingly.

B. Selection of the FBRCC MOSFETs and Design of the Ripple Cancellation Circuit

The voltage stress of the full bridge switches is the voltage across $C_{aux}$ and is therefore less than 50 V, as discussed above. In order to reduce losses, MOSFETs with a low drain-to-source voltage $V_{ds}$, low $R_{ds(on)}$, and low total gate charge $Q_g$ are preferred. For example, MOSFETs with a voltage rating of 30 V may be used. The parameters and rating values of the full bridge output inductor ($L_{FB}$) and output capacitor ($C_{FB}$) may be selected as 47 μH and 4.7 μF 50V.

C. Selection of PFC Stage Output Capacitance

The following three points should be taken into consideration when selecting the optimal PFC output capacitance:

i. The peak voltage of the double line frequency ripple should be limited to be less than the average output voltage of the LED load to ensure a high power factor for the PFC stage, as per Equation (8).

$$1/2 V_{ripple} \leq V_{LED} \quad (8)$$

ii. Although the double line frequency component is removed from the LED output current by the bipolar ripple cancellation stage, a high switching-frequency component is introduced. A higher PFC output capacitance helps to dampen this high frequency component.

iii. $C_{main}$ serves as an energy storage component in the main stage to buffer the power difference and mitigate the load current ripple. $V_{ripple}$ is inversely proportional to $C_{main}$, according to Equation (5). Minimizing the PFC output capacitance and limiting the double line frequency voltage ripple is a trade-off; which affects the maximum voltage stress on the PFC output capacitor as expressed in Equation (9) and the voltage stress on the switches in the FBRCC.

$$V_{main\_pk} = V_{LED} + 1/2 V_{ripple} \quad (9)$$

Based on the foregoing, a LED driver may be designed to meet the specifications shown in Table 1.

TABLE 1

Specifications of LED driver

| $V_{in}$ | $V_{LED}$ | $I_{LED}$ | $P_O$ | $f_{line}$ |
|---|---|---|---|---|
| 85~265 Vac | ≈150 Vdc | 0.7 A | 100 W | 60 Hz |

Figure 6:
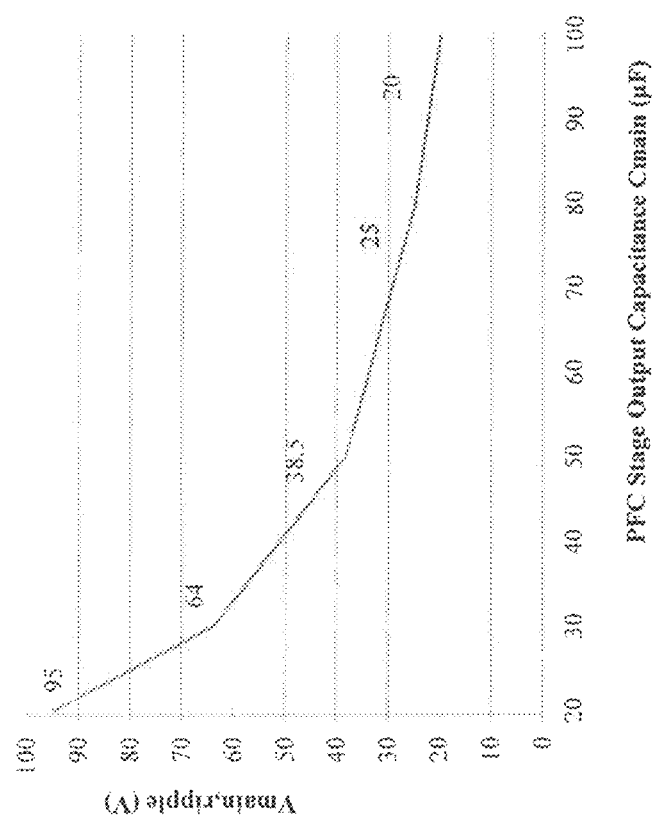
FIG. 6 is a plot showing PFC output capacitance vs. PFC output peak-to-peak ripple voltage with a LED current of 0.7 A.

With the specified LED current, the amplitude of the 120 Hz ripple of the PFC voltage depends on the output capacitance value, according to Equation (5), and increases dramatically when the output capacitance is less than 100 uF, as shown in FIG. 6.

In this example the peak-to-peak ripple voltage is 40 V (the peak value is 20 V) when the output capacitance is set to 44 µF. Therefore, two 22 µF film capacitors may be used in parallel resulting in a 120 Hz ripple of about 40 V peak-to-peak. The maximum PFC output voltage of the PFC stage is 150+20=170 V (less than the 250 V capacitor voltage rating).

D. Selection of FBRCC Input Capacitor $C_{aux}$

In order to satisfy the inequality of Equation (6), the average value of the input capacitor voltage, $V_{Caux\_avg}$, may be selected as 35 V with a maximum 10 V peak-to-peak ripple, $V_{Caux\_ripple}$ so that the allowed minimum input voltage is 30 V, which is a reasonable value to ensure normal bipolar operation of the FBRCC. Parameters for $C_{aux}$ selection are listed in Table 2.

TABLE 2

$C_{aux}$ Design Parameters

| $T_{sw}$ | $V_{FB\_pk}$ | $V_{Caux\_avg}$ | $V_{Caux\_ripple}$ |
|---|---|---|---|
| 1/156 kHz | 20 V | 35 V | 10 V (peak-peak) |

Substitution of the values in Table 2 into Equation (7) yields a minimal requirement ($C_{aux} \leq 106$ µF) for the FBRCC input capacitor value to avoid the under-cancellation phenomenon. Therefore, $C_{aux}$ may be selected as 120 µF (e.g., 10 µF×12, 50V 1206 ceramic capacitors may used).

E. $C_{FB}$ and $C_{aux}$ Layout Considerations to Suppress Audible Noise

A ceramic capacitor expands when a voltage is applied and contracts when the voltage is reduced. The printed circuit board (PCB) flexes as the capacitor changes size because the ends of the capacitor are mechanically coupled to the PCB through solder. Applying the voltage ripple at an audible frequency makes the PCB operate as a transducer (i.e., a loudspeaker). In a practical design, both $C_{FB}$ and $C_{aux}$ may be processing power at 120 Hz. Particular measures may be taken to suppress the audible noise.

For example, the 12 ceramic capacitors selected according to the above description may soldered on both sides of the PCB, six on the top layer and six on the bottom layer, back to back. In this way, the tension caused by the capacitors at the top side is offset by the tension caused by the capacitors on the bottom side. Therefore, the audible noise may be suppressed. In addition, providing a slot on both sides of the PCB may also help to reduce the noise.

Analysis of Operation

Figure 7:
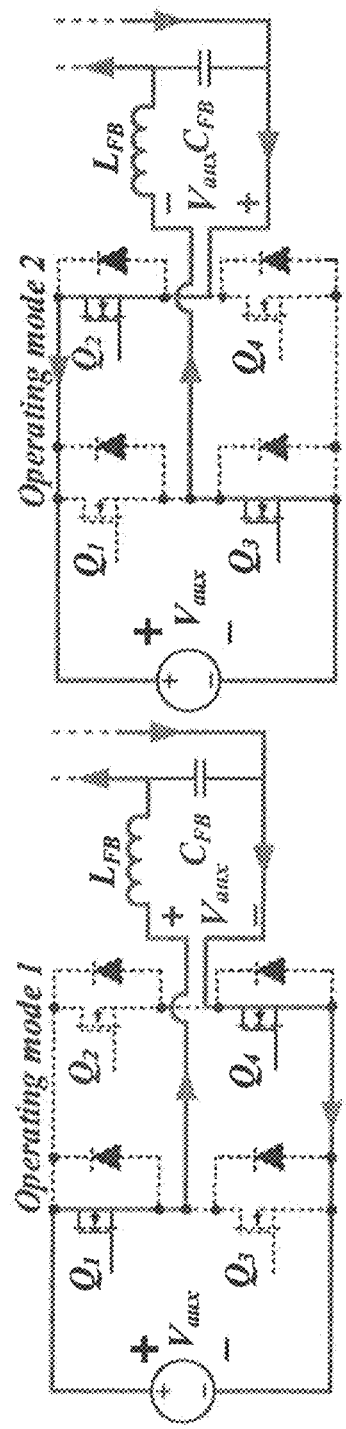
FIG. 7 shows two operating modes of a bipolar ripple cancellation converter according to one embodiment.

Two operating modes of the ripple cancellation circuit are shown in FIG. 7. The four MOSFETs $Q_1 \sim Q_4$ conduct diagonally to provide paths for the LED current $I_{LED}$. When the FBRCC output is higher than the reference, $Q_2$ and $Q_3$ are conducting while $Q_1$ and $Q_4$ are off; when the FBRCC stage output is lower, $Q_1$ and $Q_4$ are conducting while $Q_2$ and $Q_3$ are off. The PI loop (the fast PI in FIG. 4A) in the ripple cancellation section features high bandwidth to provide a quick AC reference tracking ability. Since the FBRCC output current is the LED current (a DC current), from a power flow point of view, the FBRCC stage is different from the traditional single-phase full bridge inverter in that the circuit does not contribute DC power to the LED load. It instead acts as a reservoir to buffer the power difference and completes an exchange of instantaneous power with the load once every half of a line cycle. The power loss of the bipolar ripple cancellation stage is offset by absorbing the energy from output side of the FBRCC to the floating capacitor (and the control strategy described above with reference to FIG. 4A), so that the input voltage of the FBRCC is always higher than its output voltage.

Advantages of the Embodiments

The embodiments described herein may provide one or more of the following advantages, relative to conventional single-stage approaches.

1. Low-Voltage-Rating Components in the Cancellation Stage

The four MOSFETs $Q_1 \sim Q_4$ conduct diagonally to provide paths for the output current $I_{LED}$ as shown in FIG. 7. According to features of the FBRCC topology, it sees the component stress equal to half of the double line frequency ripple, shown in (10).

$$V_{FB,max} \geq 1/2 V_{ripple} \quad (10)$$

where $V_{FB,\ max}$ is the voltage stress of the switches in the FBRCC.

Therefore, the embodiments present a double voltage ripple cancellation ability (given the components voltage stress in the additional stage are the same), compared to existing unipolar cancellation methods. The embodiments are therefore more beneficial for high power, high voltage LED driver applications, where low cost of auxiliary circuits is required.

2. Applicable to Both Isolated and Non-Isolated PFC Topologies

The offset control loop ensures that cancellation stage loss is offset from the output side of the FBRCC. Therefore, no auxiliary winding is required to provide power for the FBRCC with a floating capacitor. Therefore, the embodiments provide a more cost effective and more flexible solution applicable for both isolated and non-isolated LED driver applications.

3. Suitable for Variable Output Voltage LED Drivers

The embodiments may be adapted to different LED-load combinations, to provide drivers that can handle a wide output voltage range under the rated output current. For example, the ratio of the highest specification over the lowest specification may be higher than 2 times (e.g., $V_{LED}$=60~150V). With the prior ripple cancellation technologies, given that the auxiliary transformer winding turn ratio is fixed, the component voltage rating has to be overdesigned under low output voltage operation (e.g., $V_{LED}$<150 V) to fit the voltage stress at the highest output voltage operation (e.g., $V_{LED}$=150 V), resulting a non-optimal solution.

For the floating capacitor ripple cancellation method, the minimal $C_{aux}$ voltage of the FBRCC, $v_{Caux}$, should be higher than the peak ripple voltage at the main output, 0.5 $V_{ripple}$ (e.g., by about 10%) to ensure full cancellation of the double line frequency voltage ripple, according to Equation (6).

Equation (5) shows that the peak to peak value of the double line frequency voltage ripple in PFC output, $V_{ripple}$, is only proportional to the LED output current $I_{LED}$ as well as the PFC output capacitance $C_{main}$, given the line frequency $f_{line}$ is fixed. Therefore, the voltage stress of the floating capacitor ($C_{aux}$) is designed based on the highest LED current $I_{LED}$ as the worst case.

Compared to the prior cancellation technologies where the input capacitor voltage is determined by the LED driver DC output voltage (because the input capacitor is connected by an auxiliary winding from the PFC stage), the floating capacitor FBRCC embodiments feature significantly reduced component voltage stress and energy loss. As a result, the embodiments solve the existing overdesigning problem on the component voltage rating in the FBRCC at low output voltage operation for variable-output-voltage LED drivers, and reduce component costs in the auxiliary circuits.

4. High Efficiency

The embodiments provide high efficiency, since the FBRCC does not contribute DC power to the load and does not suffer from power losses due to an auxiliary winding and diode.

Embodiments will be further described by way of the following Examples. For the sake of brevity, certain practical design considerations, such as power loss and parasitic elements, are ignored in the Examples.

EXAMPLE 1

Experimental Prototype

A single-stage flyback LED driver with a bipolar ripple cancellation converter stage and floating capacitor was built according to the design procedure described above and the following specifications: $V_{LED} \approx 150$ V, $I_{LED}=0.7$ A, $P_O=100$ W.

The PFC output capacitance $C_{main}$ was 56 µF, thus the 120 Hz ripple of the PFC output voltage $V_{ripple}$ was 34 V (peak-to-peak) according to Equation (5).

The circuit parameters are given in Table 3 below.

TABLE 3

Circuit parameters of the experimental prototype

| Specifications of LED driver | |
| --- | --- |
| Line input voltage ($v_{in}$) | 85~265 V |
| LED output voltage ($V_{LED}$) | ~150 V |
| LED output current ($I_{LED}$) | 0.7 A |
| Output power ($P_O$) | 100 W |
| Line frequency (f) | 60 Hz |
| Active Clamp Single-Stage Flyback PFC | |
| Output Capacitor ($C_{main}$) | 56 µF (250 V film) |
| Switches ($Q_{main}, Q_{aux}$) | SPP11N80C3 |
| Diode (D) | C3D16060 |
| Turns Ratio ($N_p:N_s$) | 1.2:1 |
| Magnetizing Inductance ($L_m$) | 1300 µH |
| Internal Leakage Inductor ($L_{lek}$) | 33 µH |
| External Leakage Inductor ($L_{ext}$) | 15 µH |
| Active Clamp Capacitor ($C_{clamp}$) | 68 nF × 4 (400 V film) |
| Single-stage PFC Controller | NCP1652A |
| FBRCC stage | |
| Switching Frequency ($f_{sw}$) | 156 KHz |
| Floating Input Capacitor ($C_{aux}$) | 100 µF |
| | (10 µF × 10, 50 V 1206 ceramic) |
| Output Inductor ($L_{FB}$) | 50 µH |
| Output Capacitor ($C_{FB}$) | 4.7 µF |
| | (50 V 1206 ceramic) |
| MOSFETs ($Q_1 \sim Q_4$) | FDS5692ZCT-NDx4 |
| | (50 V, 24 mΩ) |
| LED String Load | |
| LED Chip Part Number | XMLEZW-02-0000-0B00T527Fx27 |
| Forward Voltage/pcs ($V_f$) Typ | 6 V |
| Max Current ($I_{max}$) | 2 A |
| Luminous Flux/pcs @ 670 mA | 270 lm |

In order to satisfy the inequality (6), the average value of the floating capacitor voltage, $V_{Caux\_avg}$, was selected as 35 V with a maximum 10 V peak-to-peak ripple, $V_{Caux\_ripple}$, so that the allowed minimum input voltage is 30 V which is a reasonable value to ensure bipolar ripple cancellation of the FBRCC.

Design parameters for $C_{aux}$ are listed in Table 4.

TABLE 4

$C_{aux}$ design parameters

| $T_{sw}$ | $V_{ripple}$ | $V_{Caux\_avg}$ | $V_{Caux\_ripple}$ |
| --- | --- | --- | --- |
| 1/156 kHz | 34 V | 35 V | 10 V |

Substituting the values in Table 4 into Equation (7) yields a minimal requirement ($C_{aux} \geq 91$ µF) for FBRCC input capacitance ($C_{aux}$) to avoid under compensation. $C_{aux}$ was selected as 100 µF in the (10 µF×10, 50 V 1206 ceramic capacitors).

Figure 8:
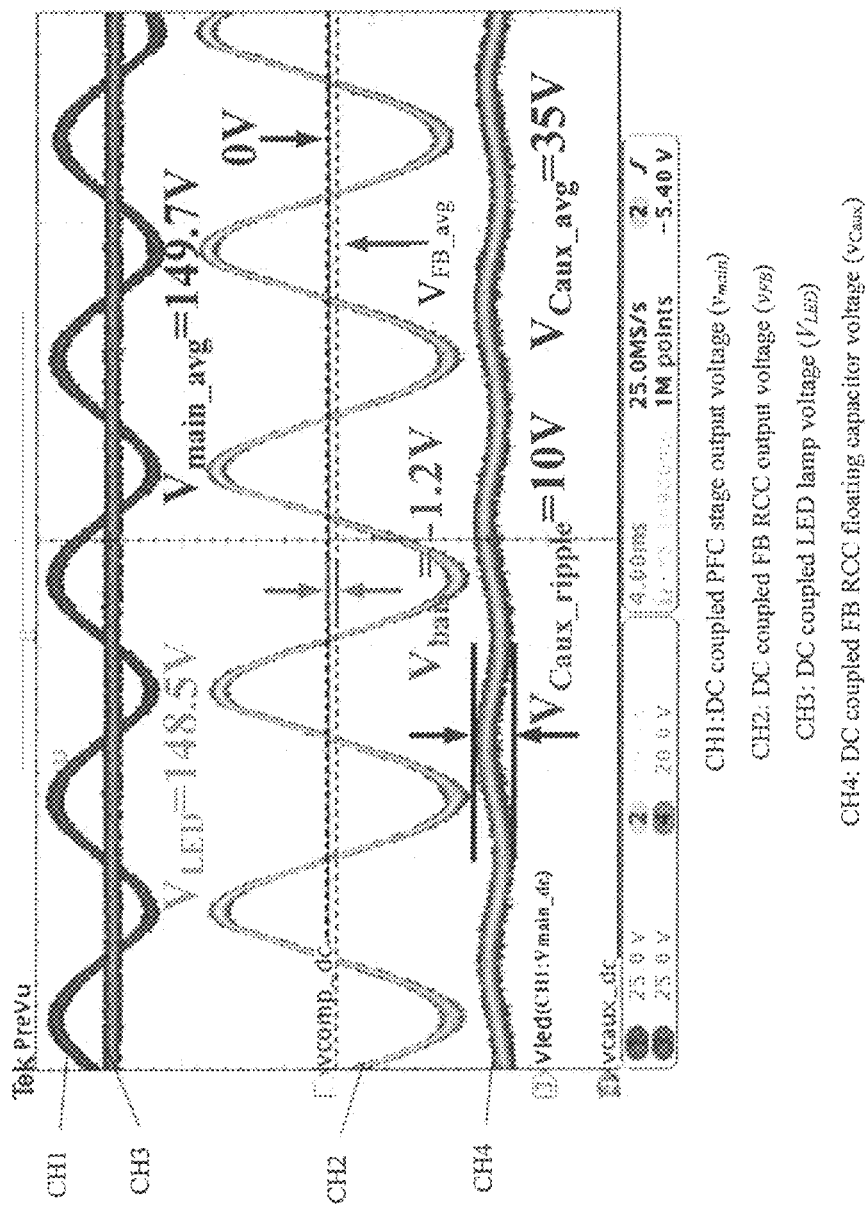
FIG. 8 shows traces of key waveforms measured for a floating capacitor FBRCC experimental prototype, wherein $V_{in}$=110 Vac. $V_{LED}$≈150 V, $I_{LED}$=0.7 A, and $P_O$=100 W.

FIG. 8 shows that the FBRCC stage input voltage $v_{Caux}$ is regulated at 35±5 V by the loss offset loop. The FBRCC stage exhibits a slight negative DC voltage bias of 1.2 V at the FBRCC stage output voltage. This experimental result validates the previous analysis for FIG. 5C.

Figure 9:
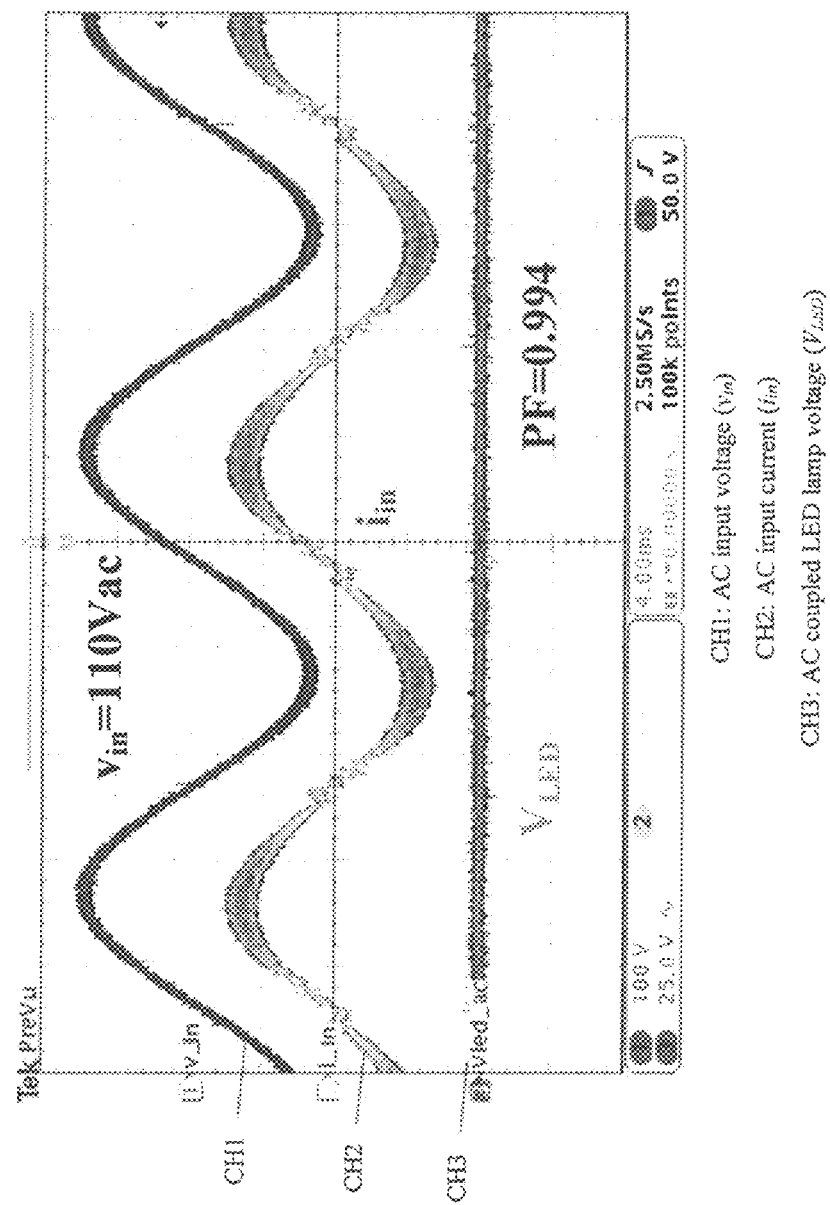
FIG. 9 shows traces of measured input current, input voltage, and output voltage of an experimental prototype wherein $V_{in}$=110 Vac, $V_{LED}$≈150 V, $I_{LED}$=0.7 A, and $P_O$=100 W.

FIG. 9 shows the input voltage and input current waveforms, and that the embodiment achieved a high PF of 0.994.

Figures 10A, 10B:
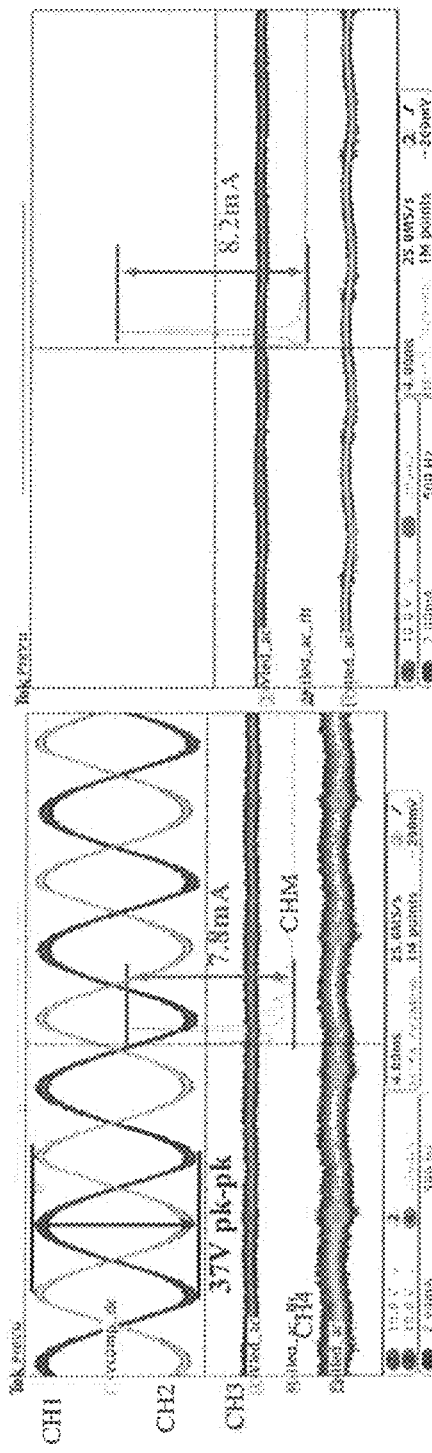
FIGS. 10A and 10B show the measured performance of an experimental prototype and a conventional single stage LED driver configuration, respectively.

FIGS. 10A and 10B compare the performance of the experimental prototype and a conventional single stage LED driver configuration, respectively. FIG. 10A shows that the embodiment produces a smaller LED driving current ripple at 120 Hz (7.8 mA RMS) with only 60.7 µF total output capacitance ($C_{main}+C_{FB}$), compared to a higher 8.2 mA RMS current ripple in the conventional single-stage LED driver, where 4700 µF output capacitance is required, as shown in FIG. 10B. Therefore, the total required output capacitance of the conventional signal-stage approach was reduced by 98.7% by the experimental prototype. Also, it should be noted that only $C_{main}$ is of a high voltage rating, while both $C_{FB}$ and $C_{aux}$ are low-voltage-rating components.

Figures 11A, 11B:
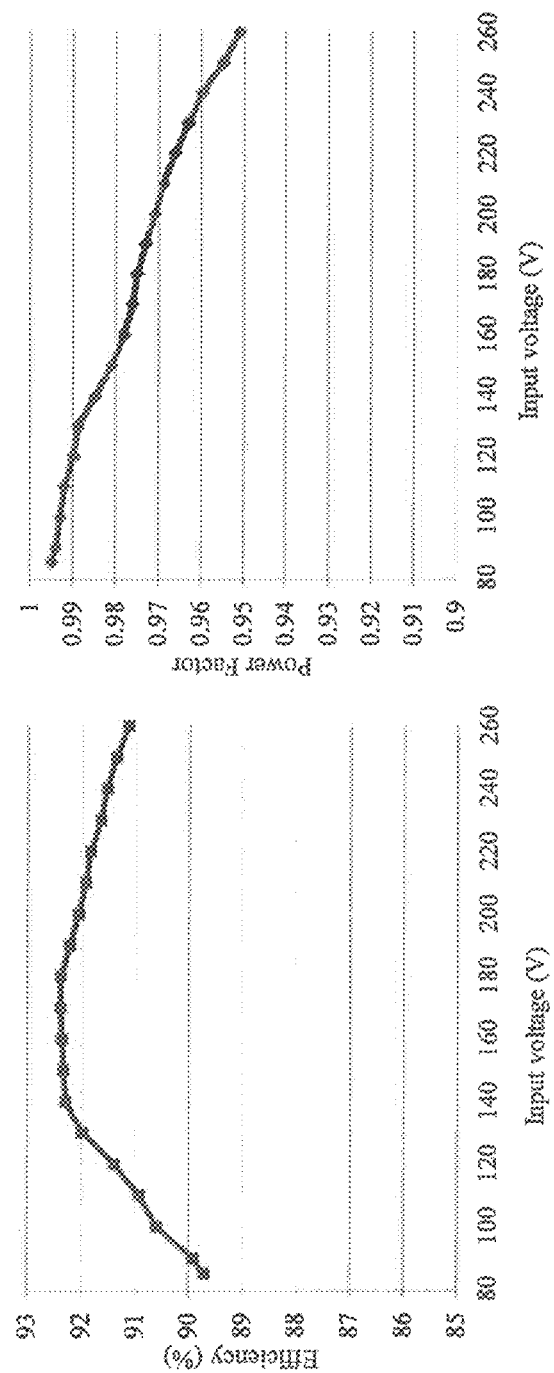
FIGS. 11A and 11B are plots showing the efficiency and power factor, respectively, as a function of input voltage, for an experimental prototype.
Figure 12:
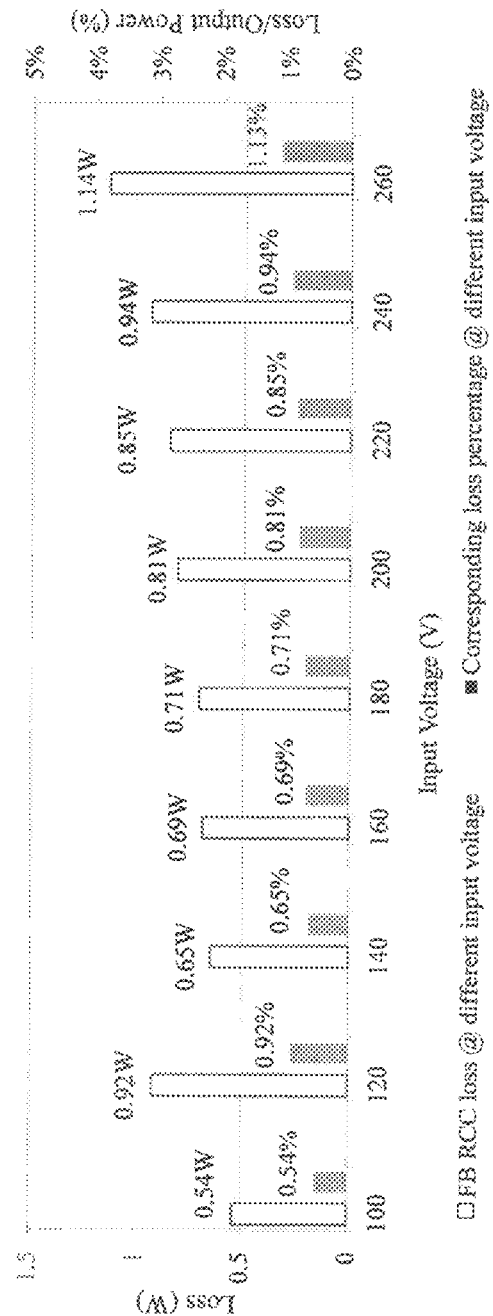
FIG. 12 is a plot showing the FBRCC stage loss and efficiency as a function of input voltage, for an experimental prototype.

FIGS. 11A and 11B show the efficiency and power factor, respectively, as a function of input voltage. It can be seen that the experimental prototype had an efficiency of 91% when $v_{in}=110$ Vac, and a peak efficiency of 92.5%. The power factor was greater than 0.95 for the entire input voltage range. The FBRCC stage loss is generally less than 1% under the range of input voltage, as shown in FIG. 12.

Figure 13:
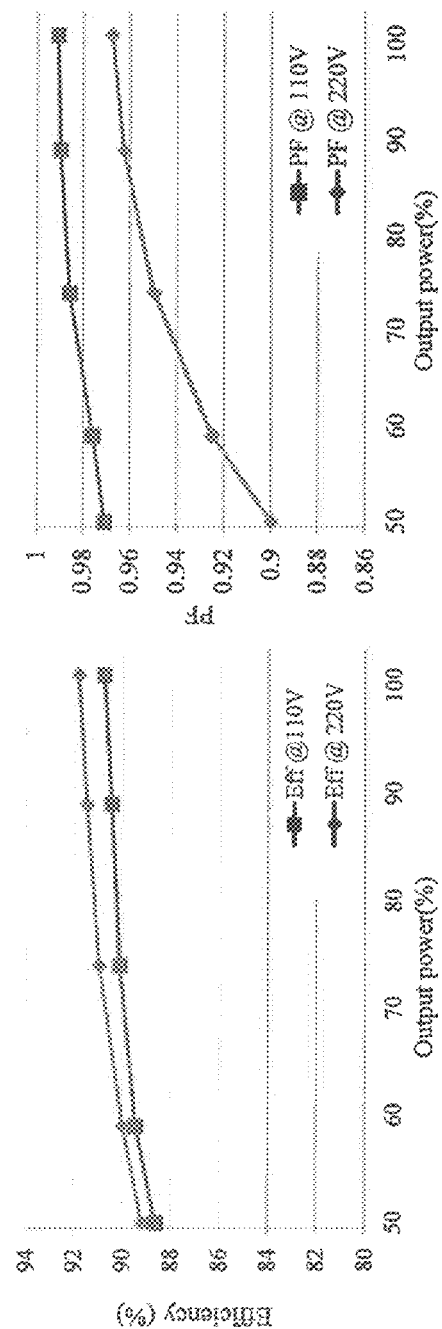
FIGS. 13A and 13B are plots showing the efficiency and power factor, respectively, during dimming at two input voltages, for an experimental prototype.

Dimming performance of the LED driver was measured and is shown in FIG. 13. The results show that the half-load ($P_O=50$ W, $V_{LED} \approx 150$ V) system efficiency is generally higher than 88.5% and the PF is over 0.9 under both the nominal input voltages (110 Vac and 220 Vac).

EXAMPLE 2

FBRCC Floating Capacitor $C_{aux}$ Design Rule Derivation

The $C_{aux}$ input voltage comprises a DC average voltage and a changing double-line-frequency voltage ripple resulting from the charging and discharging of the capacitor by the LED current, $I_{LED}$.

$$v_{C_{aux}} = V_{C_{aux\_avg}} + v_{C_{aux\_ripple}} \qquad (11)$$

According to the operation modes of the ripple cancellation converter, the input capacitor $C_{aux}$ is charged when $Q_2$ and $Q_3$ are conducting ($Q_1$ and $Q_4$ are off) and it is discharged when $Q_1$ and $Q_4$ are conducting ($Q_2$ and $Q_3$ are off). These two intervals are shown in the following equations.

$$T_{charge} = T_{sw} \cdot (1-D) \quad (12)$$

$$T_{discharge} = T_{sw} \cdot D \quad (13)$$

where $T_{sw}$ is the switching period of the ripple cancellation converter and D is the duty cycle of the driving signals for $Q_1$ and $Q_4$, as shown in the following equation.

$$D(t) = 1/2 + 1/2 \cdot M \cdot \sin(2\omega t) \quad (14)$$

where $\omega$ is the angular frequency of the line voltage and M is the modulation index of the SPWM, expressed as (15).

$$M = \frac{\frac{1}{2} V_{ripple}}{V_{C_{aux\_avg}}} \quad (15)$$

Since the average current going through the switches is fixed by the load, the difference between the charging time and the discharging time of each switching cycle determines the behaviour of the input current, leading to the increase or decrease of the input voltage. The charge for each switching cycle can be expressed by the following equation.

$$Q_{discharge}(t) = I_{LED} \cdot (T_{discharge}(t) - T_{change}(t)) \quad (16)$$
$$= I_{LED} \cdot T_{sw} \cdot M \cdot \sin(2\omega t)$$

The sum of discharge is expressed by the following equation.

$$Q_{discharge\_sum}(nT_{sw}) = \sum_{i=0}^{nT_{sw}} Q_{discharge}(t) \quad (17)$$
$$= \sum_{k=1}^{n} I_{LED} \cdot T_{sw} \cdot M \cdot \sin(2\omega \cdot kT_{sw})$$

According to the characteristics of the two-level SPWM modulation strategy, the discharging time is always longer than the charging time during the first half cycle of the line frequency before it enters the next half cycle. Therefore, the input capacitor $C_{aux}$ keeps discharging over each switching cycle and the voltage keeps decreasing until it reaches the valley at the half cycle point. Then the largest voltage drop can be calculated using the following equation.

$$V_{C_{aux\_ripple}} = \frac{Q_{discharge\_sum}\left(\frac{T_{line}}{4}\right)}{C_{aux}} \quad (18)$$

This is the worst case because the output voltage is on the peak value simultaneously.

$Q_{discharge\_sum}(T_{line}/4)$ in (18) can be simplified into (19) after mathematical deduction.

$$Q_{discharge\_sum}\left(\frac{T_{line}}{4}\right) = \sum_{k=1}^{\frac{T_{line}}{4T_{sw}}} I_{LED} \cdot M \cdot T_{sw} \cdot \sin\left(\frac{4\pi T_{sw}}{T_{line}} k\right) \quad (19)$$
$$= \frac{I_{LED} \cdot M \cdot T_{sw}}{\tan\left(\frac{2\pi T_{sw}}{T_{line}}\right)}$$

Since $T_{sw} \ll T_{line}$ ($f_{sw} \gg f_{line}$), $\tan\left(\frac{2\pi T_{sw}}{T_{line}}\right) \approx \frac{2\pi T_{sw}}{T_{line}}$ (20)

Then (19) can be further simplified, as shown in (21).

$$Q_{discharge\_sum}\left(\frac{T_{line}}{4}\right) = \frac{I_{LED} \cdot M}{2\pi \cdot f_{line}} \quad (21)$$

where $f_{line}$ is the AC line voltage frequency.

Therefore, the FBRCC is able to work normally for the whole line cycle as long as the input valley voltage is set higher than the peak output voltage. The final floating capacitor $C_{aux}$ design rule is shown in (22).

$$C_{aux\_min} \geq \frac{Q_{discharge\_sum}\left(\frac{1}{4} T_{line}\right)}{V_{C_{aux\_ripple}}} \quad (22)$$
$$= \frac{I_{LED} \cdot V_{ripple}}{4\pi \cdot f_{line} \cdot V_{C_{aux\_avg}} \cdot V_{C_{aux\_ripple}}}$$

EXAMPLE 3

Alternative Embodiment

In the above embodiments, the voltage of the floating capacitor may be regulated by a slow voltage control loop. Under certain conditions, the use of the floating capacitor may introduce a low frequency disturbance through the slow voltage control loop, making the control loop more challenging to be designed under a light load.

The floating capacitor in the bipolar ripple cancellation converter may be powered by an external or secondary DC power supply whose output voltage is higher than the peak value of the double line frequency (e.g., 120 Hz) voltage ripple of the PFC stage. This secondary power supply only offsets the small power lost in the bipolar ripple cancellation converter.

Figure 14:
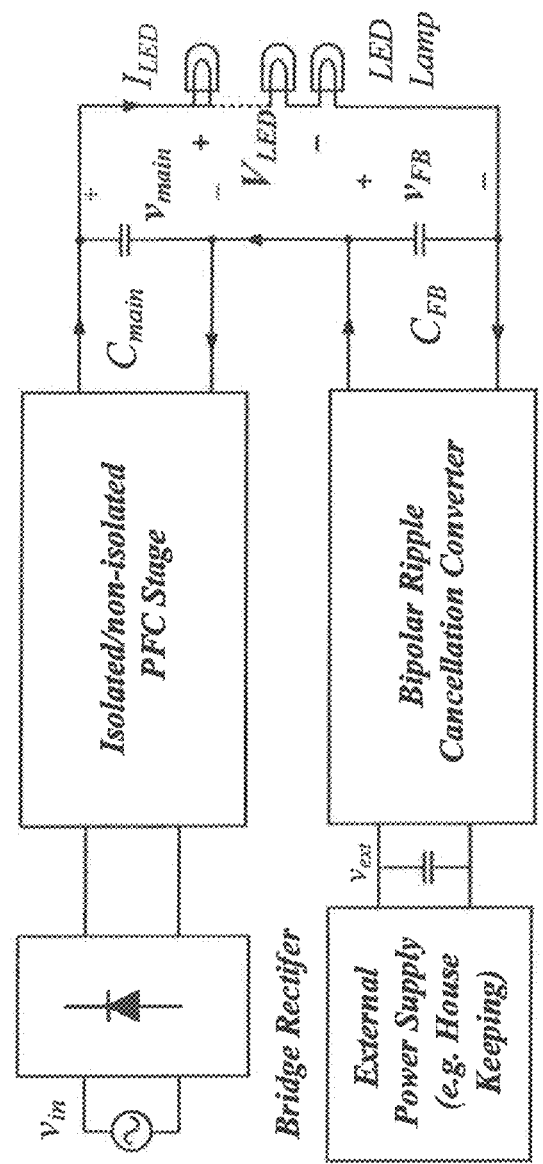
FIG. 14 is a block diagram of an LED driver with a bipolar ripple cancellation stage, according to one embodiment.

For example, some power supplies, such as LED drivers, may include a secondary or "house-keeping" power supply to provide regulated power before the main power comes on. Such a house-keeping power supply can be used as the power supply for the bipolar ripple cancellation converter as long as its output voltage is regulated to be higher than the peak value of the voltage ripple of the PFC stage at the rated output current. FIG. 14 shows one example of such an embodiment.

Figure 15:
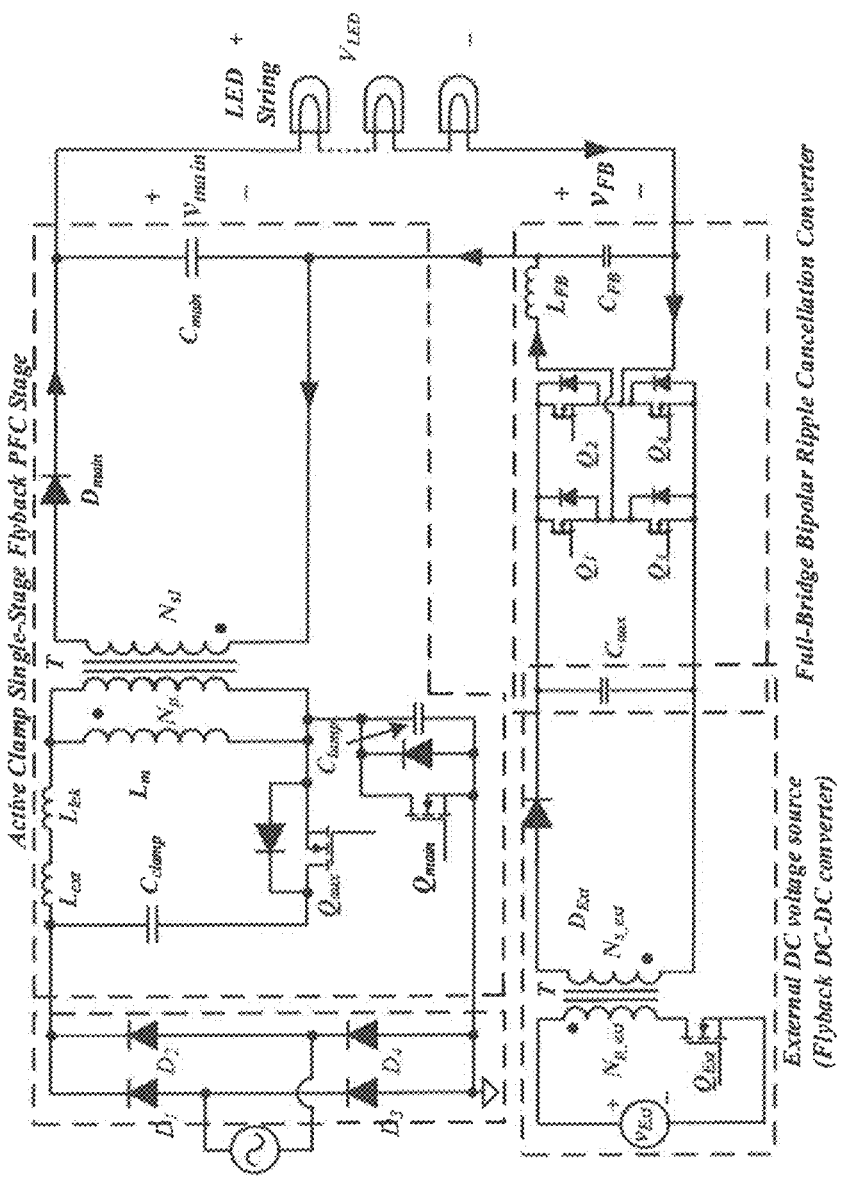
FIG. 15 is a circuit diagram showing an implementation of the embodiment of FIG. 14.

It is noted that such a secondary power supply for the bipolar ripple cancellation converter is not limited to a house keeping power supply. For example, it can be another isolated or non-isolated power converter whose output voltage is DC and is higher than the peak value of the double line frequency voltage ripple of the PFC stage. For instance, the external power supply may be another isolated converter (e.g., a flyback converter), such as the circuit shown in FIG. 15.

All cited publications are incorporated herein by reference.

Equivalents

Those skilled in the art will recognize or be able to ascertain variants of the embodiments described herein.

Such variants are within the scope of the invention and are covered by the appended claims.

The invention claimed is:

1. A power converter that converts AC input power into DC output power, comprising:
   an input circuit that receives AC input power, the input circuit having one or more power switching device;
   a first output circuit that receives power from the input circuit and provides a first output comprising a DC voltage with a first AC voltage ripple;
   a second output circuit that receives power from a circuit comprising a floating capacitor and provides a second output comprising a second AC voltage ripple, the second output circuit having one or more power switching device;
   a controller that controls the power switching devices of the input circuit and the second output circuit, and controls a voltage of the floating capacitor so that the first output circuit and the second output circuit alternatively rectify output current only once during one switching cycle of the power switching devices;
   wherein the first output and the second output are connected together in series, such that the first AC voltage ripple is substantially cancelled;
   wherein substantially ripple-free DC output power is provided.

2. The power converter of claim 1, wherein the controller includes a slow PI control loop that controls the voltage of the floating capacitor.

3. The power converter of claim 1, wherein the AC voltage ripple has a frequency that is double a line frequency of the AC input power.

4. The power converter of claim 1, wherein the controller includes a power loss offset loop that allows the second Output circuit to absorb more input energy than output energy in each double line frequency cycle;
   wherein energy loss resulting from the second output circuit is offset.

5. The power converter of claim 1, wherein the controller regulates the voltage of the floating capacitor at a reference value.

6. The power converter of claim 1, comprising a PFC converter selected from a flyback converter, a buck converter, a boost converter, an isolated boost converter, a LLC resonant converter, and a LCLC resonant converter.

7. The power converter of claim 1, further comprising a secondary power supply that provides input power to the second output circuit.

8. The power converter of claim 1, wherein the controller controls the one or more power switching device of the input circuit so that the input circuit achieves a high power factor.

9. A method for converting AC input power into DC output power, comprising:
   receiving AC input power using an input circuit having one or more power switching device;
   using a first output circuit to receive power from the input circuit and provide a first output comprising a DC voltage with a first AC voltage ripple;
   using a second output circuit including a floating capacitor and one or more power switching device to provide a second output comprising a second AC voltage ripple;
   controlling the power switching devices of the input circuit and the second output circuit and controlling a voltage of the floating capacitor so that the first output circuit and the second output circuit alternatively rectify output current only once during one switching cycle of the power switching devices;
   connecting the first output and the second output together in series, such that the first AC voltage ripple is substantially cancelled;
   wherein the AC input power is converted into substantially ripple-free DC output power.

10. The method of claim 9, wherein controlling includes using a slow PI control loop to control the voltage of the floating capacitor.

11. The method of claim 9, wherein the AC voltage ripple has a frequency that is double a line frequency of the AC input power.

12. The method of claim 9, wherein controlling includes allowing the second output circuit to absorb more input energy than output energy in each double line frequency cycle;
   wherein energy loss resulting from the second output circuit is offset.

13. The method of claim 12, wherein controlling includes using a power loss offset loop to allow the second output circuit to absorb more input energy than output energy in each double line frequency cycle.

14. The method of claim 9, wherein controlling regulates the voltage of the floating capacitor at a reference value.

15. The method of claim 9, comprising using a PFC converter selected from a flyback converter, a buck converter, a boost converter, an isolated boost converter, a LLC resonant converter, and a LCLC resonant converter.

16. The method of claim 9, further comprising providing input power to the second output circuit using a secondary power supply.

17. The method of claim 9, including controlling the one or more power switching device of the input circuit so that the input circuit achieves a high power factor.

* * * * *